United States Patent [19]

Poulson

[11] Patent Number: 4,491,065
[45] Date of Patent: Jan. 1, 1985

[54] FOOD HEATING APPARATUS

[76] Inventor: Larry Poulson, 9909 Stave Lake St., Mission, Canada, V2V 4J1

[21] Appl. No.: 375,453

[22] Filed: May 6, 1982

[51] Int. Cl.³ .............................................. A47J 37/00
[52] U.S. Cl. ...................................... 99/327; 99/427; 99/447; 99/450; 126/21 A; 34/133
[58] Field of Search ................ 99/427, 331, 352, 447, 99/450, 476, 481, 327, 332, 335; 126/21 A; 219/400; 34/133, 72; 434/72

[56] References Cited

U.S. PATENT DOCUMENTS

| | | | |
|---|---|---|---|
| 1,995,966 | 3/1935 | Delemme | 34/109 |
| 2,197,100 | 4/1940 | Downes | 34/109 |
| 2,344,135 | 3/1944 | Downes | 34/109 |
| 2,443,419 | 6/1948 | Gould | 34/109 |
| 3,908,535 | 9/1975 | Gordon | 99/450 X |
| 4,155,294 | 5/1979 | Langhammer et al. | 99/427 |
| 4,250,955 | 2/1981 | Plattner et al. | 219/400 X |
| 4,295,419 | 10/1981 | Langhammer | 99/427 |
| 4,386,558 | 6/1983 | Holman et al. | 99/447 X |

FOREIGN PATENT DOCUMENTS

| | | | |
|---|---|---|---|
| 2606942 | of 1977 | Fed. Rep. of Germany | 99/447 |
| 590720 | 6/1925 | France | 99/427 |
| 960584 | of 1949 | France | 99/476 |

Primary Examiner—Billy J. Wilhite
Assistant Examiner—Christine A. Peterson
Attorney, Agent, or Firm—Hughes, Barnard & Cassidy

[57] ABSTRACT

An oven having a heating chamber in which a perforate food container is rotatably mounted about a center axis of rotation. The container has, relative to its longitudinal center axis, a symmetrical octagonal configuration so as to comprise two planar end walls and eight symmetrically arranged sidewalls. The container rotates at a slow rate, and hot air is directed upwardly and laterally through the food in the container to heat the same. Formed in the upper wall of the oven is an elongate planar condensation chamber, and exhaust fumes from the cooking oven pass upwardly and forwardly into this condensation chamber, in a manner to combine with ambient air so as to lower the temperature and enhance condensation.

16 Claims, 6 Drawing Figures

FOOD HEATING APPARATUS

BACKGROUND OF THE INVENTION

The present invention relates to ovens for heating food products, and more particularly to an oven which circulates hot air through food products which are held in a perforate rotating container.

A very popular form of cooked potatoes is what is commonly known as "french fries". It is estimated that in North America alone, there are sixteen billion servings of french fries consumed annually. The common method of cooking french fries is to cut the potatoes into elongate pieces, having a generally square cross-sectional configuration of about ¼ to ½ inch in diameter. (There are also other forms, such as forming rounded pieces of mashed potatoes.) The potato pieces are then placed in a wire basket and lowered into a high temperature cooking oil to cook the potatoes with a crisp fried surface.

One of the problems of cooking french fries in this manner in a restaurant is that a reservoir of high temperature oil must be maintained for long periods of time. There are some elements of danger in maintaining this hot oil. First, the oil sometimes splatters on a person's skin, causing serious burns. Also, maintaining this high temperature oil can itself be a fire hazzard, and the oil must be changed (or at least should be changed) with reasonable frequency. Further, the fumes which are emitted from this cooking oil must be vented to outside atmosphere, and this requires extra equipment. Another consideration is that with increasing emphasis on low fat diets, deep frying in oil is for some people quite undesirable.

Another method of cooking french fries is to simply lay the potato pieces on a pan and heat these in a conventional oven. However, the unexposed surfaces of the potato pieces (i.e., the surfaces which rest against the pan or those which are positioned one against the other) are not directly in contact with the hot air, with the result that the entire surface of each piece is not cooked with a uniform crispness. One solution to this problem would be to open the oven at periodic intervals and move the potato pieces to different positions on the pan. However, in a restaurant operation, this constant opening and closing of the oven would be impractical.

Another approach to the cooking of french fried potatoes without immersing them in oil is shown in two U.S. patents, U.S. Pat. Nos. 4,155,294 and 4,259,419. In these patents, there is shown a perforate food container which has a square cross sectional configuration and which is mounted for rotation in an oven chamber. Hot air is blown toward the food container to heat the potato pieces or other food products in the container. As the container is slowly rotated in the chamber, the food pieces change position relative to one another so that the surfaces of the food pieces are cooked with greater uniformity.

While the apparatus shown in these two U.S. patents is an advance in the art, there is still need for continuing improvement. One concern is that the tumbling action of the potato pieces should be such that there is as little breakage of the potato pieces as possible. Another concern is that the movement of the potato pieces be such as to have as much uniformity of cooking as possible (i.e., that substantially all surface portions are cooked with sufficient crispness and that adequate heat is imparted to each piece).

Another consideration is the venting of the fumes which result from the cooking of the potato pieces. Generally the potato pieces are precooked and then frozen. In the precooking, oil is used so that there is a residual amount of oil on the surfaces of the potato pieces. When the potatoes are heated by hot air, some of the more volatile elements of the surface oil vaporize, with some going through partial combustion. If these smoke-like gaseous products are permitted to accumulate in the oven chamber, when the oven is opened, these can enter into the ambient atmosphere, making a smoke-filled kitchen. Therefore the proper handling of the gaseous accumulation from the fries can be a problem.

In view of the foregoing, it is an object of the present invention to provide a food heating apparatus and method with a desirable balance of advantageous features to alleviate many of the problems associated with heating food, such as those recited above.

SUMMARY OF THE INVENTION

The oven of the present invention is particularly adapted to cook a food product made up of individual food pieces, such as potato pieces, commonly known as french fries. This oven comprises a structure having chamber wall means defining a heating chamber. There is a perforate food container adapted to be mounted for rotation in the chamber about an axis of rotation which has a substantially horizontal component of alignment. The container has a substantially closed sidewall comprising, in the preferred form, at least eight substantially flat plate members arranged in a generally symmetrical pattern around the axis.

There is drive means to rotate the container in a predetermined direction of rotation to carry a contained food product upwardly along one side of the sidewall toward a slanted position, with the food product tending to tumble downwardly in the container from said slanted position. Further, there is heating means to direct a hot gaseous medium through the container to heat the contained food product.

In the preferred form, the heating means comprises discharge means defining a discharge slot that extends generally parallel to the axis of rotation and is arranged to direct said gaseous medium upwardly and laterally through said one side of the container. Preferably, the discharge means is arranged to direct the gaseous medium generally perpendicular to a plane of slant of said slanted position of the food product in the container.

The preferred configuration of the chamber wall means is such that it comprises a wall section which is curved in a generally semicircular pattern around the axis of rotation and is located in close proximity to the second side of the food container. The direction of rotation is such that the second side of the food container which is in close proximity to the wall portion is travelling in a downward direction, with contained food products being carried upwardly in the container on said one side of the container.

The preferred form of the container is such that in cross sectional configuration perpendicular to the axis of rotation is shaped substantially as a regular octagon symmetrically arranged about said axis of rotation. Preferably, the container comprises two container sections which can be joined to one another and separated from one another, the two sections joining one another along juncture lines substantially parallel to the axis of rotation. Preferably, the juncture lines extend generally along middle portions of two of the plate members which are positioned opposite one another, with the container being provided with outwardly extending interconnecting slide members by which said container sections are joined to one another.

The oven chamber has a front opening, and there is a door to close the front opening. Further, there is a shield plate adapted to be positioned across an upper part of the oven opening. The shield plate is shaped to provide an upper opening means at an upper part of the shield plate. The oven further comprises venting means having a forward intake opening located proximate said upper opening means of the shield plate, and a venting passage to carry gaseous exhaust from said oven chamber.

In the preferred form, the shield plate is contoured to provide at its upper edge a horizontally extending slot. Further, the venting system intake opening has an elongate configuraiton extending generally parallel across the slot provided by the slot plate.

In its closed position, the oven door closes the oven chamber opening and provides at an upper portion of the door upper opening means to permit gaseous exhaust in the oven chamber to pass through said upper opening means to the intake opening of the venting system.

With the door in its closed position, the venting system intake opening is exposed to ambient atmosphere, so that gaseous exhaust from the oven chamber passing into the intake opening combines with the ambient air. The venting system further comprises a condensing chamber to which gaseous exhaust and ambient atmosphere passes after entering the intake opening to condense out at least a portion of the gaseous exhaust.

In the preferred configuration, the oven has a top wall above the heating chamber, and this top wall comprises upper and lower plate means which define the condensation chamber.

In the present invention, there is provided an oven structure with a perforate food container such as that described above. The food container is first filled with a food product, then inserted into the oven chamber and rotated at a relatively slow rotational speed. At the same time, a hot gaseous medium is directed through the container to heat the contained food product. Desirably, the hot gaseous medium is directed in the manner described above with respect to the description of the oven. Further, gaseous exhaust from the oven is directed from the upper part of the oven to be mixed with ambient atmosphere and directed through a condensation chamber to condense out some of the gaseous exhaust.

Further, the oven of the present invention is provided with an operating system comprising a main switch means to direct power to a first motor means to rotate the food container, a second motor means to blow a hot gaseous medium through the food container, and a third motor means to draw gaseous exhaust into the condensation chamber. There is second switch means interconnected with the first and second motor means and responsive to the opening of the oven door so that opening of the oven door opens the second switch means.

Additionally, there is third switch means connected between the first switch means and the first and second motor means so that operation of the first and second motor means can be selective controlled.

There is a fourth timing switch means by which the first and second motor means can be selectively operated for a predetermined period of time. Also, there is a fifth switch means to deliver power to the heating means, and this is operable through the fourth timing switch means.

Finally, there is a sixth switch means responsive to positioning of the food container, and this sixth switch means is in parallel with the fourth timing switch means. Thus, even though the timing switch means has opened, operation of the first motor continues until the food container is in the proper position for loading and unloading.

Other features of the present invention will become apparent from the following detailed description.

DESCRIPTION OF THE PREFERRED EMBODIMENT

Figure 1:
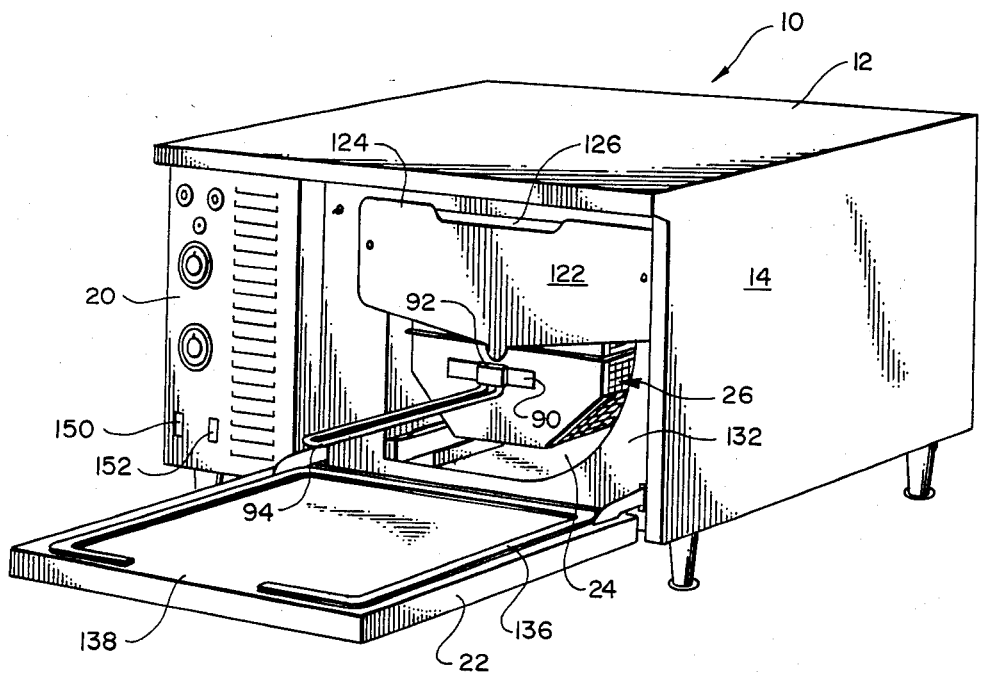
FIG. 1 is a perspective view of the apparatus of the present invention, with the oven door open.

With reference to the accompanying drawing, there is shown an oven 10, having a main structure made up of a top wall 12, two sidewalls 14, a rear wall 16 and a bottom wall 18. At the front of the oven structure, there is a left front panel 20 having control switches and indicators thereon, and a main front door 22 which extends from the front center portion of the oven to the forward edge of the right sidewall 14.

In the right portion of the oven 10, there is a heating chamber 24 in which there is positioned a food container 26. Specifically, this heating chamber 24 is defined by a housing insert 28, which can be seen more clearly in the exploded view of FIG. 2. This housing insert 28 has a right wall portion 30 which is uniformly curved in the configuration of half of a cylindrical wall. Additionally, there is a flat top wall 32, a flat rectangularly shaped left wall 34 and a flat rear wall 36 which closes the rear portion housing insert 28. The bottom wall 38 of the housing insert 28 has a generally flat configuration, but it is formed in a manner to provide an elongate slanted slot 40. As will be disclosed further hereinafter, hot air is directed upwardly and to the right through the slot 40 to pass through food pieces located in the food container 26.

More specifically, the housing insert slot 40 is defined by an upper flange member 42, the right hand portion of which is turned upwardly at about 30 degrees from the horizontal. Further, there is a lower flange member 44 which has a right hand edge portion which slants upwardly to match the slant of the flange member 42. The left hand portions of the two flanges 42 and 44 extend horizontally so that the left part of the slot 40 is horizontal and the right portion slants upwardly to the right at about a 30 degree angle.

Positioned within the oven structure just to the left of the left insert wall 34 of the housing insert 28 is the air heating and circulating assembly 46, which serves to blow hot air through the slot 40 and into the heating chamber 24. This assembly 46 comprises a squirrel cage fan 48 which is centrally mounted in the assembly 46 for rotation about a transverse horizontal axis. Surrounding the front, rear and top portions of the fan 48 are a number of electrical resistance heating elements 50. Additionally, surrounding the heating elements 50 is a curved plate or vane member 52 which curves in a generally spiral configuration (i.e. a scroll case). The effect of this is that as the fan 48 discharges the air outwardly in a counterclockwise direction (as viewed from inside the oven chamber 24 looking left toward the fan 48), the air moves through the heating elements 50 to the lower entry portion of the slot 40 to pass through the slot 40 upwardly and to the right so as to be directed into the food container 26. The air then recirculates back through the left wall opening 51 to the fan.

The food container 26 is made up of upper and lower sections 26a and 26b which in over all configuration are substantially identical to one another. With the two sections 26a and 26b joined to one another, the container 26 has the configuration of a right angle prism, where the ends of the prism are made as regular octagons, and where there are eight rectangular side sections forming the entire closed sidewall of the prism. Thus, the container 26 has a forward wall 54 (made up of upper and lower wall sections 54a and 54b), and a rear wall 56 (made up of upper and lower wall sections 56a and 56b). The sidewall of the container 26 is generally designated 58, and this is made of flat metal plate material having a plurality of generally rectangular holes which are present throughout the entire sidewall 58.

Specifically, the sidewall 58 has an upper portion 58a which is made up of a top wall 60a, and two slanted walls 62a joining the top wall 60a at opposite edge portions thereof and making an angle of 135 degrees with the top wall 60a. Also, there are two sidewall sections 64a having a width dimension one-half that of the top wall 60a and slanted wall 62a.

In like manner, the lower section 26b has a bottom wall 60b corresponding to the top wall 60a, two slanted walls 62b, corresponding to the two walls 62a and two sidewall portions 64b. Each sidewall section 64a meets a related sidewall section 64b to form a related one of the eight sidewalls of the octagonal structure.

Figure 2:
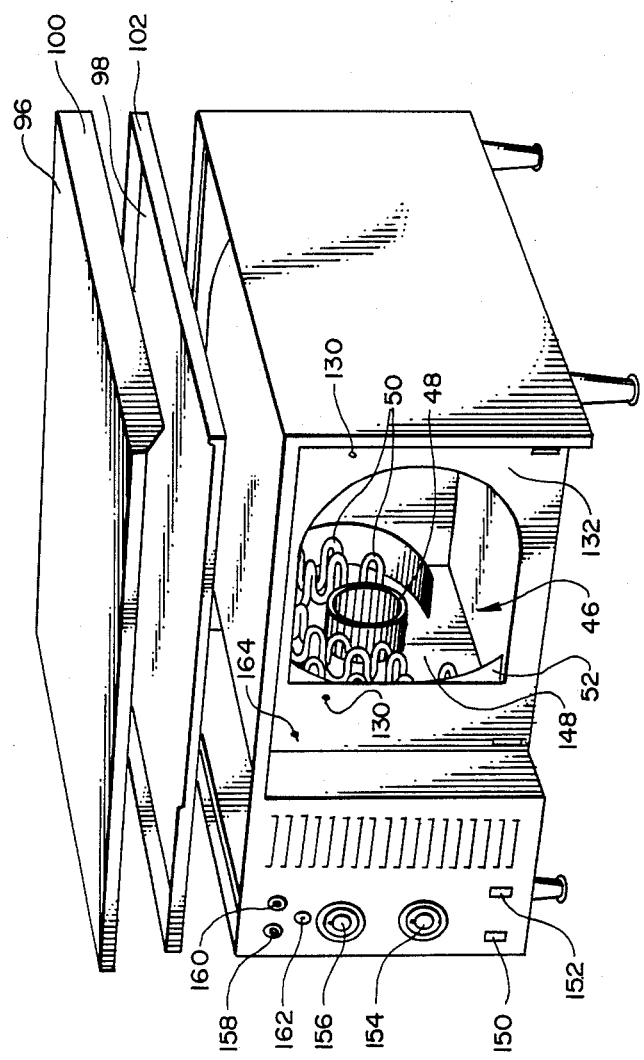
FIG. 2 is an isometric exploded view, showing the housing for the heating chamber and the food container removed from the oven structure.
Figure 2:
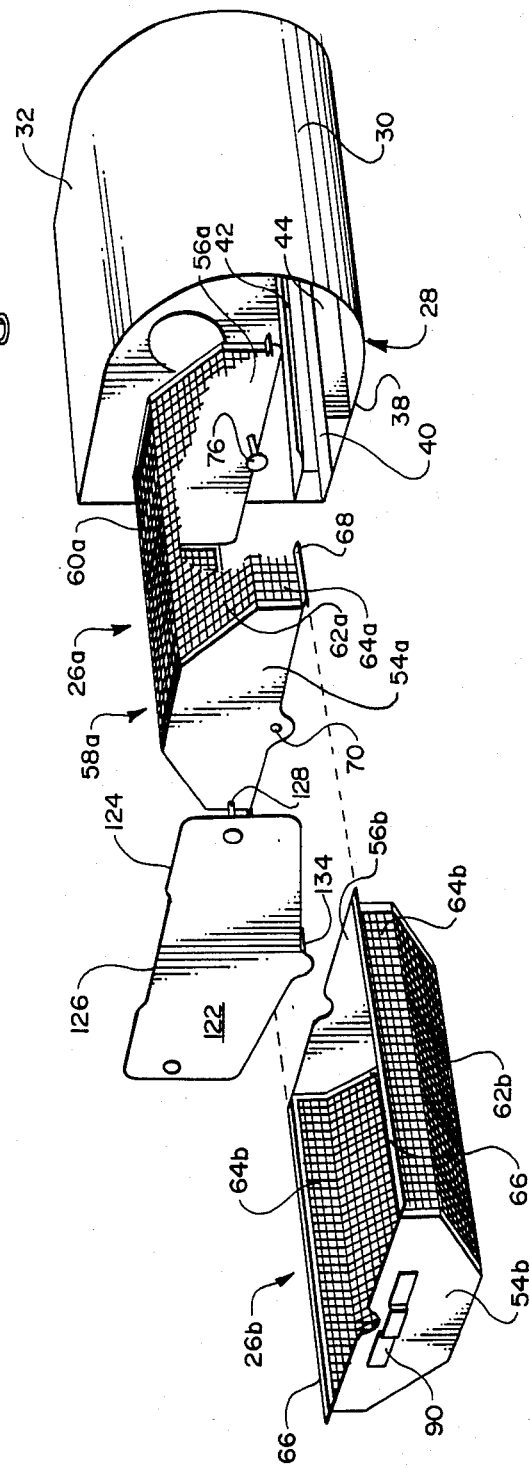

As is illustrated in FIG. 2, the upper and lower container sections 26a and 26b have a slide connection. Specifically, at the upper edges of the two lower sidewall sections 64b, there are a pair of laterally and outwardly extending flanges 66. The lower edge of each of the two upper sidewall sections 64a each have a flange member 68 which is doubled back on itself to form an elongate receiving slot to receive a related one of the flanges 66. Thus, when the lower container section 26b is positioned in alignment with the upper section 26a as shown in FIG. 2, it can simply be slid rearwardly, with the flanges 66 fitting into the related slots of the flanges 68.

The forward upper wall portion 54a has at its lower middle part a small downward protrusion 70 which is formed with a through hole 72. This hole 72 is positioned at the geometric center of the regular octagon defined by the forward wall sections 54a and 54b. The forward and rear lower wall sections 54b and 56b are each formed with a small recess at the middle of the upper edge to accomodate the protrusion 70 when the upper and lower sections 26a and 26b are being slid into engagement with one another.

At the lower middle portion of the upper rear wall section 56a, there is a rearwardly extending stud 76. For purposes of illustration, in FIG. 2, the stud 76 is shown as positioned moderately forwardly of the rear wall upper section 56a while in actual construction, it extends rearwardly beyond the rear wall section 56a, as in FIG. 4. This stud 76 is adapted to fit in a socket member 78 of a rotisserie drive, generally designated 80.

Figure 5:
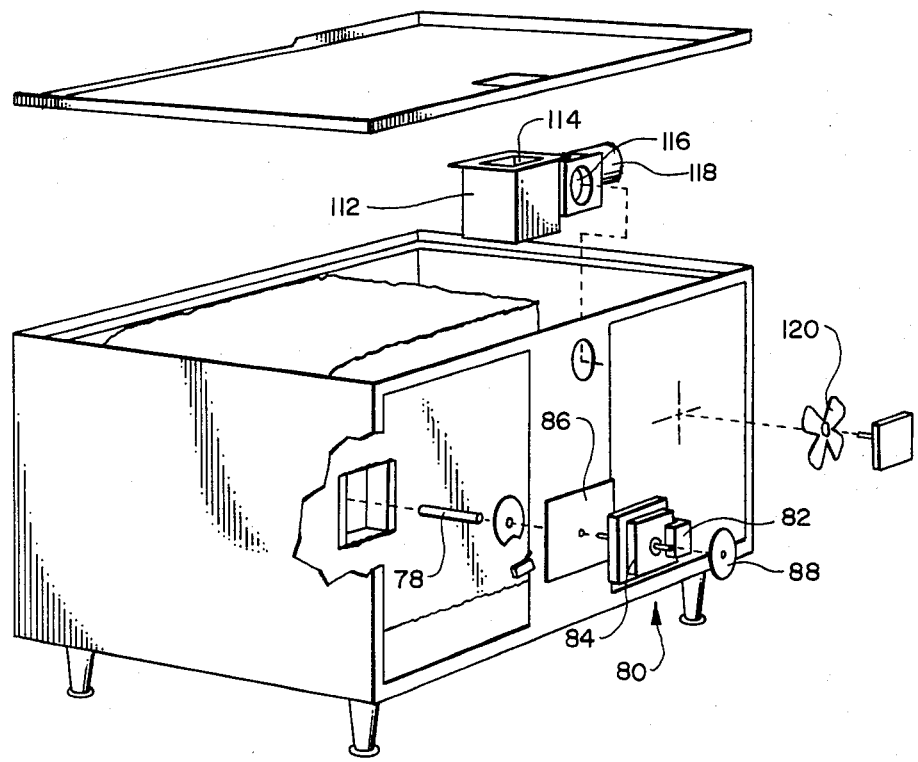
FIG. 5 is an exploded isometric view looking at the rear of the oven and showing certain components separated from the other structure; and, FIG. 6 is a schematic drawing of the wiring diagram of the present invention.

The components of the rotisserie drive 80 are illustrated in an exploded view in FIG. 5. This drive 80 is, in and of itself conventional, and comprises a motor 82 which acts through a speed reducing gear drive 84 to rotate the socket member 78. These components are mounted by means of a suitable mounting plate 86. Also, the drive unit 80 has its own fan 88 for cooling. The stud 76 is formed with one or more flat sides, and the socket member 78 has a matching configuration, so that the stud 76 can be placed into driving relationship with the socket member 78. In normal operation, the upper container portion 26a can simply be moved rearwardly into the chamber 24 so that the stud 76 and socket member 78 come into drive relationship. In this position, the stud 76 and socket member 78 are sufficiently rigid so that these two members 76 and 78 are able to independently support the upper container portion 26a in the chamber 24.

The lower forward wall portion 54b has attached thereto at the middle part of its forward surface a metal strip 90 which defines with the wall portion a shallow vertically aligned slot to receive an upwardly extending prong 92 of a lifting member 94. Alternatively the strip 90 could be provided by stamping a strip portion of the front plate 54b outwardly to form the slot to receive the prong 92 of the handle 94. The lifting member 94 simply comprises an elongate handle made as two rods, with the prong 92 being joined to the end of the rods. By simply inserting the prong 92 upwardly into the slot defined by the metal strip 92, the lower containing section 26b can be slid forwardly from its engaged position with the upper section 26a, and then carried by the lifting member 94 to some other location.

The top wall 12 of the housing structure is made of two large rectangular plates, namely an upper plate 96 and a lower plate 98. The upper plate 96 has downwardly extending peripheral flanges 100 which can be joined to upwardly extending flanges 102 of the lower plate 98 so that the two plates 96 and 98 are spaced moderately from one another to form a relatively shallow condensing chamber 104. This chamber 104 is closed along its rear and side edges and extends substantially across the entire upper part of the oven 10. The forward part of the upper plate 96 extends a short distance beyond the forward edge of the lower plate 98, and the upper plate 96 has at its forward edge a downwardly extending flange 106 which, with the forward edge of the lower plate 98, defines an elongate downwardly facing slot 108. This slot 108 is positioned a short distance forwardly from and slightly above the front door 22.

At the rear portion of the condensing chamber 104, there is an exhaust fan assembly 110. This comprises a rather shallow rectangular receiving duct 112 which communicates through an intake opening 114 with the chamber 104. This assembly 110 also comprises a fan 116 and motor 118 in a conventional arrangement. Also, there is an auxiliary cooling fan 120 for the motor 118. With the fan assembly 110 operating, air is drawn upwardly through the forward slot 108 to pass rearwardly through the condensing chamber 104 and collect in the duct 112 to be discharged by the fan 116.

There is a shield plate 122, which is adapted to be removably mounted over the upper part of the forward open end of the heating chamber 24. This shield 122 has a generally planar rectangular configuration, with the upper edge 124 moderately recessed at 126 along the middle portion. At the side edges of this shield 122, there are a pair of studs 128 which fit in matching holes 130 in a front plate 132 surrounding the front opening of the heating chamber 24.

The lower edge of the shield 122 has a rearwardly extending mounting stud 134 which fits into the hole 72 in the protrusion 70 of the upper front wall portion 54a. When the shield 122 is positioned over the front opening of the chamber 24 by inserting the studs 128 into the holes 72, the stud 134 fits in the hole 72 to provide support for the forward end of the upper container section 26a. The recess 126 along the upper edge 124 functions to direct the gaseous collection in the oven chamber 24 into the condensing chamber 104, this will be described herein. In addition to its other functions, the shield plate holds the housing insert 28 in place during operation of the oven.

Figure 4:
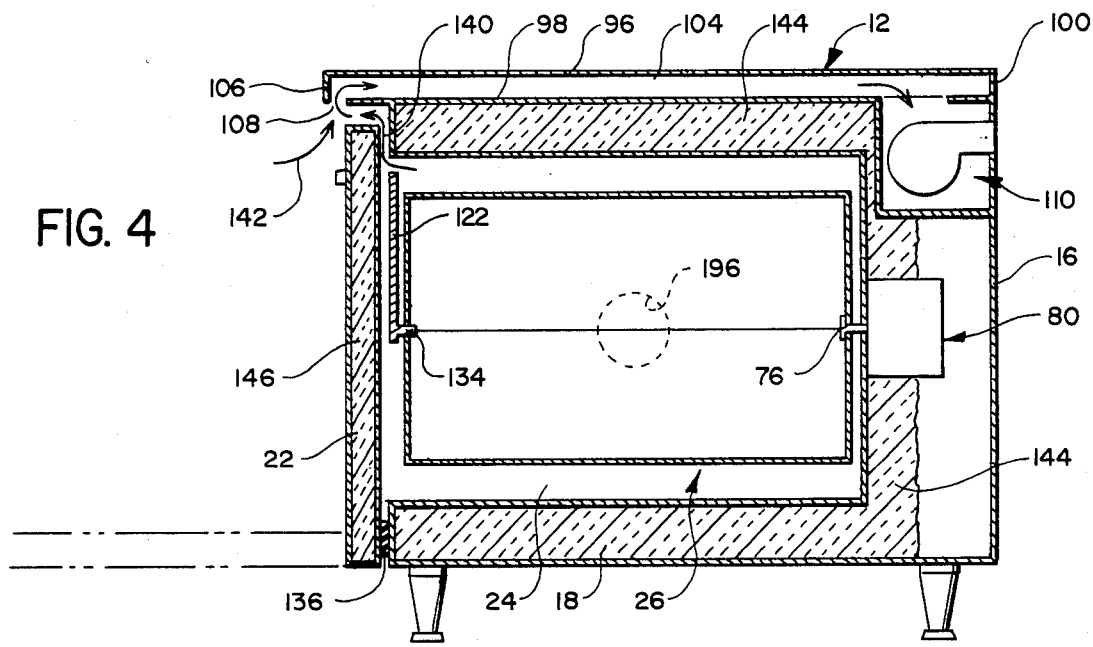
FIG. 4 is a sectional view taken along line 4—4 of FIG. 3.

The front door 22 is hinge mounted at its lower edge at the front opening of the heating chamber 24. The inside surface of this door 22 has around most of its periphery a flexible sealing strip 136 that fits against the plate 132. However, the upper middle portion of the inner surface of the door 22 does not have such a sealing strip so as to provide an unsealed area generally indicated at 138. When the door 22 is in its closed position, as shown in FIG. 4, this unsealed area 138 forms with the front plate 132 an upper elongate rather shallow gap, which is indicated in FIG. 4 at 140. The inside surface of the door 22 can be made as a removeable panel, which can be detached from the door 22 for cleaning, without requiring removal of the entire door 22.

When the oven door is closed, and a food product, such as potato pieces, is being heated in the container 26, there is a certain amount of smokey gaseous exhaust which passes upwardly over the upper recessed edge 126 of the shield 122 and through the rather shallow gap 140 at the upper middle edge portion of the front door 22. This exhaust passes over the upper edge of the door 22 and is drawn into the intake slot 108 of the condensing chamber 104. Also, ambient air is drawn into the slot 104, and this entry of ambient air is indicated in FIG. 4 by an arrow at 142. The effect of the ambient air mixing with the hot gaseous exhaust is that the temperature of the exhaust gases are lowered substantially to enhance condensation in the chamber 104.

An insulating material 144 is placed above, below, behind, and around the right side of the housing insert 28. Also, the front door 22 is provided with insulation material, indicated at 146. There is an interior wall 148 positioned just to the left of the air heating and circulating assembly 46, and this also is insulated. Thus, with the front door 22 closed, the heating chamber 24 and the air heating and circulating assembly 46 are substantially insulated from ambient atmosphere. Further, it will be noted that the condensation chamber 104 is positioned above the top layer of insulation 144.

As indicated previously, the control and indicating elements are mounted in the front left panel 20. Specifically, these comprise a main on/off push button switch 150 and a convection switch 152. Both of these switches are incorporated with an indicating light which shows that the switch is in its closed position when the light is on. There is a timer switch 154 which can be rotated to the desired position to time the operation of the oven 10. Also, there is a thermostat switch 156 which can be set to determine the temperature in the heating chamber 24.

At the upper end of the panel 20, there is a red light indicator 158. When this light is on, it indicates that the food container 26 is being rotated, and it thus cautions the person against opening the front door 22. Also, there is a green light indicator 160, and when this is lit, it indicates that the food container 26 has stopped rotating, so that the door 22 can be safely opened. Finally, there is on the panel 20 a thermostat light 162 which lights up when heating elements 50 are being heated. On the front plate 132 there is an interlock switch 164. When the door 22 is closed, this interlock switch 164 is pushed to its closed position. When the door 22 is opened, the switch 164 moves to its open position.

With reference to FIG. 5, there is shown a switch activiting cam member 166 fixedly mounted to the socket member 78. The edge of the cam 166 engages a positioning switch 168. The cam edge is provided with a recessed portion 170, and when the cam 166 rotates to a position where the recess 170 is next to the switch 168, the switch 168 moves to its open position. Further rotation of the cam 166 causes the edge of the cam to push against the switch 168 and cause it to close.

Figure 6:
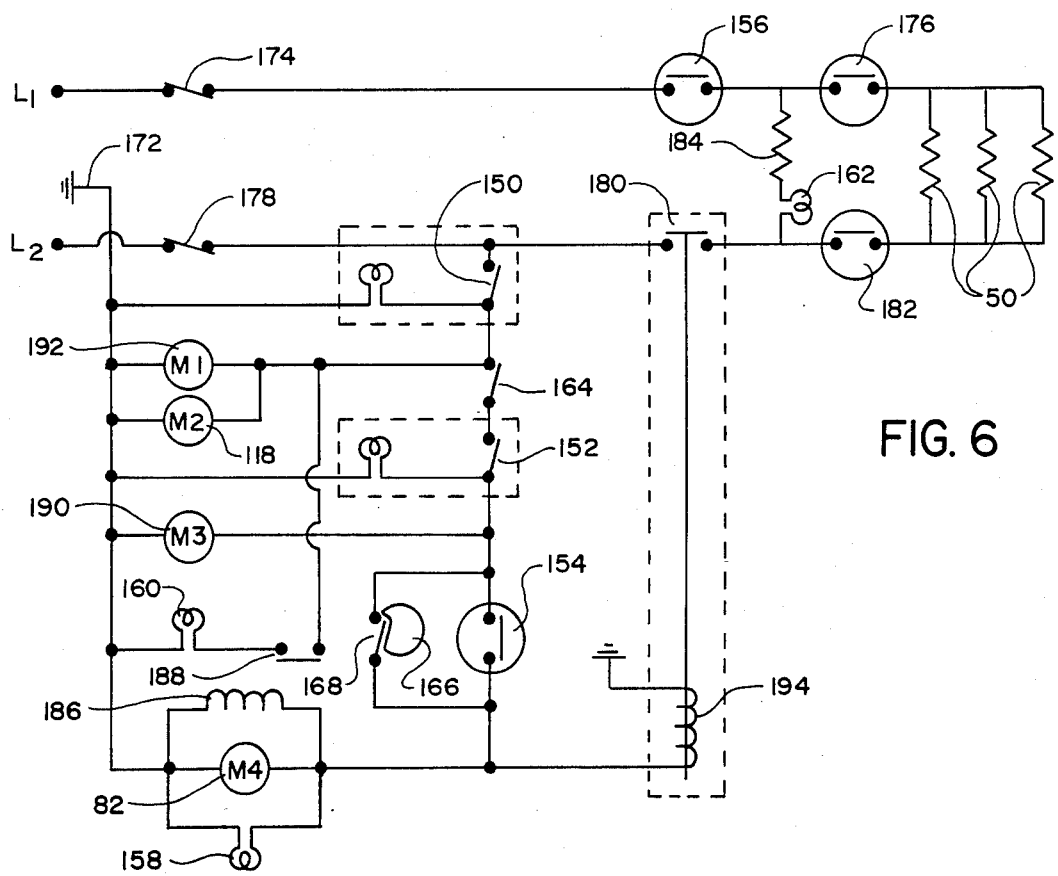

Reference is now made to FIG. 6, wherein the control components of the oven 10 are shown in a circuit diagram. Alternating current is fed through two lines L-1 and L-2, with a phase shift between the two lines so as to create a voltage difference therebetween. Also, there is a ground line 172. The upper line L-1 connects to a first fuse 174 to the thermostat switch 156, which is in turn connected in series to a safety thermostat 176 and thence to the heating elements 50. The second line L-2 is connected through a second fuse 178 to a relay switch 180 and then through a second safety thermostat 182 to the opposite sides of the heating elements 50. Also, the thermostat indicating light 162 is connected through a resistor 184 between the two lines L-1 and L-2, in a manner that when the thermostat switch 156 and the relay switch 180 are closed, the thermostat light 162 is on.

The main on/off switch 150, the door interlock switch 164, and the convection switch 152 are connected in series with the timer switch 154. The timer switch 154 in turn is connected to one input of the rotisserie drive motor 82, the other side of which is connected to the ground line 172. Thus, when the four switches 150, 164, 152 and 154 are closed, the motor 82 operates to rotate the food container 26.

In addition, the cam positioning switch 168 is connected in parallel with the timer switch 154. Thus, even though the timer switch 154 is open, the switch 168 remains closed to cause the motor 82 to continue to operate. However, when the food container reaches its loading and unloading position, as shown in FIG. 1, the cam 166 operates to turn the switch 168 off so as to stop the motor 82 and leave the food container 26 stationary. The red indicator light 158 is connected in parallel with the motor 82. Thus, when the motor 82 stops, the red light 158 turns off to indicate that it is safe to open the oven door 22. Also, a coil 186 of a normally closed relay switch 188 is connected in parallel with the motor 82. When current is directed to the motor 82, current also flows through the coil 186 to open the switch 188, to interrupt current to the green light 160. However, when the motor 82 stops, current stops to flow through the coil 186, so that the switch 188 is permitted to close to turn the green light 160 on, thus indicating that it is safe to open the oven door 22.

There is a convection motor 190 which is operatably connected to the squirrel cage fan 48 of the air heating and circulating assembly 46. This motor 190 is connected between the ground line 172 and a location between the convection switch 152 and the timer 154. Thus, when the switches 150, 164 and 152 are closed, the motor 190 continues to operate to circulate air through the heating chamber 26. The motor 118 for the exhaust fan assembly 110 is connected between the ground line 172 and a location between the main switch 150 and the door interlock switch 164. Thus, whenever the main switch is on, the exhaust fan assembly 110 will continue to operate, even though the door 22 is open (thus opening the door interlock switch 164).

Also, there is a cooling motor 192 which is positioned in the left portion of the oven to move cooling air through the portion of the oven located left of the wall 148. This helps to cool the convection motor 190 and also cool the various control components contained in that part of the oven.

A coil 194 for the relay switch 180 is operatively connected between ground and a location between the timer switch 154 and the rotisserie motor 82. Thus, whenever the rotisserie motor 82 is operating, the switch 180 is closed so that heat continues to be delivered through the heating coils 50.

To describe now the operation of the apparatus of the present invention, let it be assumed that the main switch 150 is at the "off" position, and the door 22 is open as shown in FIG. 1. The lower food container section 26b is readily removed by engaging the lower section 26b with the lifting handle 94 as illustrated in FIG. 1. The lower section 26b is slid forwardly out of engagement with the upper section 26a, and then a portion of food product is placed in the lower section 26b. If the food product is frozen french fried potatoes, then a typical load for one cooking operation would be about four pounds of frozen french fries.

The lower food container section 26b, with the potato pieces contained therein, is slid back into engagement with the upper section 26a so that it is back in the position of FIG. 1. The handle 94 is removed, and the oven door 22 is closed. In this position, the container 26 functions as a single structure, and it is rotatably mounted by means of the socket member 78 and the stud 134 on the shield plate 122. The thermostat 156 is set to the desired position; the timer switch 154 is moved to the desired setting; and the main switch 150 and the convection switch 154 are both pushed to the "on" position. This causes the four motors 82, 190, 118, and 192 to begin operating. At the same time current is fed through the relay coil 194 to close the switch 180 to cause current to be directed to the heating coils 50.

Figure 3:
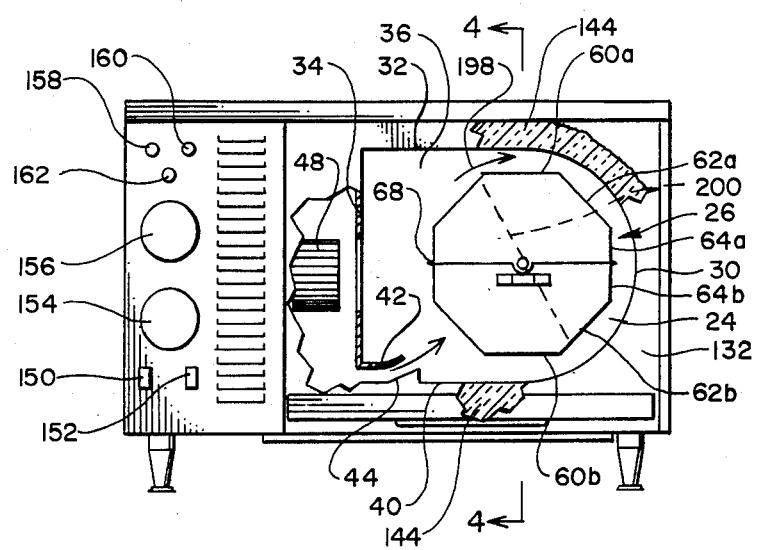
FIG. 3 is a front elevational view of the apparatus shown in FIG. 1.

The motor 190 operates the squirrel cage fan 48 to direct air in a spiral path through the heating coils 50 and thence through the slanted air slot 40. The air passes from the slot 40 upwardly and to the right so as to pass directly through the food product in the container 26. The air is then recirculated through the center opening 196 back through the fan 48. The rotisserie drive 80 rotates the container 26 in a clockwise direction, as viewed from the front of the oven 10 (the direction of rotation being indicated in FIG. 3 by the arrow 198). The rotisserie drive 80 is arranged so that the container 26 is rotated at a relatively slow rate (e.g. three revolutions per minute). As the container 26 rotates slowly, it will carry the food pieces upwardly in the direction of rotation, until the food pieces reach a relatively steep slant indicated in FIG. 3 at 200. If the food product is elongate potato pieces (i.e. the configuration of conventional french fried potatoes), when the potato pieces reach this relatively steep angle, they begin tumbling down along this slanted surface 200 to the opposite side of the container 26. In this manner, the potato pieces continue to reposition themselves in the container 26 so that different surface portions of the potato pieces become exposed to the hot air. Further, the slant of the hot air slot 40 is such that the hot air is directed through the middle portion of the potatoes which are located in the upwardly slanted position as indicated in FIG. 3.

It has been found that the octagonal cross sectional configuration of the container 26, in combination with the positioning of the air slot 40 and the direction of rotation of the food container 26, has particular advantages, particularly in comparison with a food container having a square cross sectional configuration. First, the octagonal configuration gives, for a comparable oven area, approximately 40% greater volume than the square configuration. It is desirable that the clearance between the container sidewall 58 and the cylindrical wall portion 30 of the housing insert 28 be kept as small as possible. One reason for this is that the air tends to circulate through the food product to a greater degree, rather than simply being passed through the space between the container 26 and the cylindrical sidewall portion 30. Also, by keeping the volume of the heating chamber 24 to a minimum heat is conserved.

The octagonal cross sectional configuration of the container 26 promotes an improved tumbling action of the potato pieces to substantially alleviate the problem of a certain amount of breakage of the potato pieces. It was found that with the square configuration of the basket, there was something of a tendency for the potato product to move as a batch against one sidewall and then against another when the container was rotated. On the other hand, with this octagonal configuration, there was a greater tendency for the food product to simply move down over the slanted surface of the potato pieces in a more constant tumbling action in much smaller quantities. In other words, there is more of a gradual continuous tumbling than a periodic batch tumbling of the food product. This enhances the repositioning in more uniform cooking of the potato product in a more random fashion to enhance greater uniformity of cooking.

Further, while providing the above advantages, this octagonal configuration prevents slippage of the food product along the sidewall 58. For experimental purposes, the applicant in the present application constructed a food container with a circular cross sectional configuration. However, when this type of container was rotated, as the food product moved upwardly on one side of the container, there was a tendency for it to slip along the inner surface of the container so that the potato pieces would remain in substantially the same position relative to one another. This lack of redistributing and repositioning the food product caused substantial surface portions of the potato pieces to remain unexposed to hot air and thus undercooked. It was found that with the octagonal configuration this was prevented, in addition to promoting the more controlled tumbling action.

An improvement from the square configuration of the basket can be made by going to a hexagonal configuration. However, this creates a problem in providing clearance for the mounting flanges 66 and 68. In a hexagonal configuration, these flanges 66 and 68 would be located at the line along which adjacent side surfaces of the hexagon would meet. The presence of the flanges 66 and 68 at this location would require greater clearance between the housing Winsert sidewall 30 and the container 26. It would be possible to make the cross sectional configuration of the container 26 to be that of a regular polygon having greater than eight sides, but there is no real advantage in doing so. The increase in internal volume would be relatively small, and the closer the cross sectional configuration comes to a circle the greater the tendency for the food product to slip over the sidewall, rather than promote the tumbling action.

As the hot air is being directed from the slot 40 through the food product in the container 26, there is an accumulation of a smokey gaseous exhaust in the upper part of the oven. As indicated in FIG. 4, this passes over the top edge of the shield 122 and out through the gap 140 along the top portion of the oven. The suction of the exhaust fan assembly 110 causes the gaseous exhaust to be drawn upwardly into the entry slot 108 so as to pass through the condensing chamber 104. As indicated previously, at the same time, ambient air is drawn into the slot 108 to mix with the gaseous exhaust. The resultant lowering of temperature of the gaseous exhaust causes a substantial amount of the volatiles and combustion products to condense in the chamber 104 and come to rest on the bottom plate 98. The upper plate 96 can be removed periodically for cleaning the accumulation of condensed smoke and volatile products. The gaseous exhaust which is discharged from the fan assembly 110 can be vented quite readily through conventional venting apparatus.

When a four pound batch of frozen french fried potatoes is being cooked, the timer 154 is generally set so that the food product will cook for approximately four to five minutes. At the end of this time period, the timer switch 154 opens. If the container 26 is other than at the loading and unloading position, as seen in FIG. 1 and FIG. 3 the cam 166 will be positioned so that the switch 168 remains closed. This will cause the motor 82 to continue to operate and to continue rotating the container 26. However, when the container 26 reaches the load and unload position the cam 166 permits the positioning switch 168 to open and thus shut off the motor 82 and stop rotation of the food container 26. When the motor 82 stops, the red light goes out to indicate that it is safe to open the oven door 22, and the green light 160 turns on as a further indication of the safe condition to open the door. When both of these switches 154 and 168 are open, then power is no longer delivered to the relay 194, with the result that the switch 180 opens to stop current being delivered to the heating coils 50.

When the oven door 22 is opened, the door interlock switch 164 automatically opens to stop current flow to the convection motor 190. This in turn stops the air from blowing through the slot 40. However, the motors 118 and 192 continue to operate so that air continues to be drawn into the condensation chamber 104. There is a tendency for most of the smokey exhaust to accumulate in the upper part of the heating oven. The shield plate 122 prevents most of this gaseous exhaust from immediately passing into the ambient atmosphere. Rather, this exhaust passes over the top middle recess 126 in close proximity to the intake slot 108. Thus, most of the remaining exhaust passes through the condensation chamber, and what remains as uncondensed gaseous product passes through the exhaust fan assembly 110 and is discharged through other venting apparatus.

When it is desired to clean the entire food container 26, it is a simple matter to remove the shield plate 122 and remove also the upper food container section 26a from the housing insert 28. Further, the entire housing insert 28 can be moved away from the oven, as indicated in FIG. 2 so that it can be cleaned.

Further, it will be readily apparent that various modifications can be made without departing from the novel features of the present invention. For example, the two sections 26a and 26b can be made so that the front and rear wall sections 54a, 54b, 56a, and 56b are made of the same material as the sidewall sections 58a and 58b. In like manner, other structural modifications could be made.

I claim:
1. An oven adapted to cook a food product made up of individual food pieces, said oven comprising:
 (a) a structure having chamber wall means defining a heating chamber;
 (b) a perforate food container adapted to be mounted for rotation in said chamber about an axis of rotation which has a substantial horizontal component of alignment, said container having a substantially closed sidewall;
 (c) drive means to rotate the container in a predetermined direction of rotation to carry a contained food product upwardly along one side of the sidewall toward a slanted position, with the food product tending to tumble downwardly in the container from said slanted position;
 (d) heating means to direct a hot gaseous medium through said container to heat the contained food product; and
 (e) said oven chamber having a front opening and a door to close said front opening, said oven further comprising a shield plate adapted to be positioned across an upper part of said oven opening, said shield plate being shaped to provide upper opening means at an upper part of said shield plate, said oven further comprising a venting system having a forward intake opening located proximate said upper opening means of the shield plate, and a venting passage to carry gaseous exhaust from said oven chamber.

2. The oven as recited in claim 1, wherein said shield plate is contoured to provide at its upper edge portion a horizontally extending slot, and said venting system intake opening has an elongate configuration extending generally parallel to the slot provided by the shield plate.

3. The oven as recited in claim 2, wherein said door in its closed position closes the oven chamber opening and provides at an upper portion of said door upper opening means to permit gaseous exhaust in said oven chamber to pass through said upper opening means to the intake opening of the venting system.

4. The oven as recited in claim 3, wherein with the door in its closed position, the venting system intake opening is exposed to ambient atmosphere, so that gaseous exhaust from the oven chamber passing into the intake opening combines with ambient air, said venting system further comprising a condensing chamber through which gaseous exhaust and ambient atmosphere passes after entering said intake opening to condense out at least a portion of said gaseous exhaust.

5. The oven as recited in claim 1, wherein
   (a) said heating means comprises discharge means defining a discharge slot that extends generally parallel to the axis of rotation and is arranged to direct said gaseous medium upwardly and laterally through said one side of said container;
   (b) said chamber wall means comprises a wall section which is curved in a generally semicircular pattern around said axis of rotation and is located in close proximity to a second side of said food container, said direction of rotation being such that said second side of the food container which is in close proximity to said wall section is travelling in a downward direction, said slot means being arranged to direct the gaseous medium upwardly and laterally into said opposite side of the food container;
   (c) said container comprises two container sections which can be joined to one another and separated from one another, said two sections joining one another along juncture lines substantially parallel to said axis of rotation;
   (d) said oven chamber has a front opening and there is a door to close said front opening, said oven further comprising a shield plate adapted to be positioned across an upper part of said oven opening, said shield plate being shaped to provide upper opening means at an upper part of said shield plate, said oven further comprising venting means having a forward intake opening located proximate said upper opening means of the shield plate, and a venting passage to carry gaseous exhaust from said oven chamber.

6. The oven as recited in claim 5, wherein saidshield plate is contoured to provide at its upper edge portion a horizontally extending slot, and said venting system intake opening has an elongate configuration extending generally parallel across the slot provided by the shield plate.

7. The apparatus as recited in claim 6, wherein said door in its closed position closes the oven chamber opening and provides at an upper portion of said door upper opening means to permit gaseous exhaust in said oven chamber to pass through said upper opening means to the intake opening of the venting system.

8. The oven as recited in claim 7, wherein with the door in its closed position the venting system intake opening is exposed to ambient atmosphere, so that gaseous exhaust from the oven chamber passing into the intake opening combines with ambient air, said venting system further comprising a condensing chamber through which gaseous exhaust and ambient atmosphere passes after entering said intake opening to condense out at least a portion of said gaseous exhaust.

9. The oven as recited in claim 8, wherein said shield plate is provided with mounting means to which a forward end of said food container can be removably mounted for rotation.

10. An oven adapted to cook a food product made up of individual food pieces, said oven comprising:
   (a) a structure having a chamber wall means defining a heating chamber,
   (b) a perforate food container adapted to be mounted for rotation in said chamber about an axis of rotation which has a substantial horizontal component of alignment,
   (c) a drive means to rotate the container in a predetermined direction of rotation to carry a contained food product upwardly along one side of the sidewall toward a slanted position, with the food product tending to tumble downwardly in the container from said slanted position,
   (d) heating means to direct a hot gaseous medium through said container to heat the contained food product,
   (e) said oven chamber having a front opening, said oven further comprising a door to close the front opening,
   (f) said oven having a top wall above said heating chamber, said top wall comprising upper and lower plate means defining therebetween a condensation chamber, said condensation chamber having at a forward location above said front door in its closed position a front intake opening,
   (g) said door in its closed position being arranged to close the oven chamber and provide at an upper portion of said door upper opening means to permit gaseous exhaust in the oven chamber to pass through said upper opening means to the intake opening for the condensation chamber,
   (h) said intake opening for the condensation chamber being arranged, relative to the door in its closed position, to be exposed to ambient atmosphere, whereby gaseous exhaust passing into said intake opening is combined with ambient air to lower the temperature of said gaseous exhaust and enhance condensation,
   (i) means to cause a pressure reduction in said condensation chamber to draw ambient air and gaseous exhaust into said intake opening and into said condensation chamber.

11. The oven as recited in claim 10, further comprising a shield plate adapted to be positioned across an upper part of said oven opening inside of said door in its closed position, said shield plate being shaped to provide upper opening means at an upper part of the shield plate, whereby when said oven door is open, gaseous exhaust in an upper portion of said heating chamber passes through the opening means of the shield plate to pass into the intake opening of the condensation chamber.

12. The oven as recited in claim 11, wherein said shield plate is contoured to provide at its upper edge portion a horizontally extending slot, and the intake opening of the condensation chamber has an elongate configuration extending generally parallel across the slot provided by the shield plate.

13. An oven adapted to cook a food product made up of individual food pieces, said oven comprising:
   (a) a structure having a chamber wall means defining a heating chamber;
   (b) a perforate food container adapted to be mounted for rotation in said chamber about an axis of rotation which has a substantial horizontal component of alignment;

(c) a first motor means to rotate the container in a predetermined direction of rotation to carry a contained food product upwardly along one side of the sidewall toward a slanted position, with the food product tending to tumble downwardly in the container from said slanted position;
(d) heating means to heat and direct a hot gaseous medium through said container to heat the contained food product, including second motor means to drive a fan of said heating means;
(e) said oven chamber having a front opening, said oven further comprising a door to close the front opening;
(f) said oven having a condensation chamber with an intake opening to receive gaseous exhaust from the oven chamber to pass through the condensation chamber;
(g) third motor means and fan means to cause said gaseous exhaust to pass into said condensation chamber and to draw ambient air into said condensation chamber;
(h) first main switch means to make a connection to transmit power to said first, second, and third motor means;
(i) second switch means connected in series between said first main switch means and said first and second motor means to be able to selectively transmit power to or interrupt power to said first and second motor means, said second switch means being responsive to movement of said front door in a manner that opening of said door opens said second switch means;
(j) third selectively operable switch means connect in a series with the first and second switch means and connected to the first and second motor means, in a manner that closing said third switch means enables current to be delivered to said first and second motor means;
(k) fourth timing switch means arranged to be closed selectively for a predetermined time interval and connected in series between said first main switch means and said first motor means, so that the first motor means can be caused to operate for a predetermined period of time;
(l) fifth switch means operatively connected to said heating means and responsive to opening and closing of said fourth timing switch means, in a manner that opening of said fourth switch means interrupts power being delivered to said heating means.

14. The oven as recited in claim 13, further comprising a food container sixth positioning switch means which is connected in parallel with said fourth timing switch means, said sixth switch means being responsive to the position of the food container in a manner that when the food container is positioned for removal from the oven chamber, said positioning switch means is moved to an open position to stop delivering power to said first motor means at such time as the fourth timing switch means is open.

15. An oven adapted to cook a food product made up of individual food pieces, said oven comprising:
(a) a structure having a chamber wall means defining a heating chamber,
(b) a perforate food container adapted to be mounted for rotation in said chamber about an axis of rotation which has a substantial horizontal component of alignment,
(c) a first motor means to rotate the container in a predetermined direction of rotation to carry a contained food product upwardly along one side of the sidewall toward a slanted position, with the food product tending to tumble downwardly in the container from said slanted position,
(d) heating means to heat and direct a hot gaseous medium through said container to heat the contained food product, including second motor means to drive a fan of said heating means,
(e) said oven chamber having a front opening, said oven further comprising a door to close the front opening,
(f) said oven having a top wall above said heating chamber, said top wall comprising upper and lower plate means defining therebetween a condensation chamber, said condensation chamber having at a location above said front door in its closed position a front intake opening,
(g) said door in its closed position being arranged to close the oven chamber and provide at an upper portion of said door upper opening means to permit gaseous exhaust in the oven chamber to pass through said upper opening means to the intake opening for the condensation chamber,
(h) said intake opening for the condensation chamber being arranged, relative to the door in its closed position, to be exposed to ambient atmosphere, whereby gaseous exhaust passing into said intake opening is combined with ambient air to lower the temperature of said gaseous exhaust and enhance condensation,
(i) third motor means and fan means to cause a pressure reduction in said condensation chamber to draw ambient air and gaseous exhaust into said intake opening and into said condensation chamber,
(j) first main switch means to make a connection to transmit power to said first, second, and third motor means,
(k) second switch means connected in series between said first main switch means and said first and second motor means to be able to selectively transmit power to or interrupt power to said first and second motor means, said second switch means being responsive to movement of said front door in a manner that opening of said door opens said second switch means,
(l) third selectively operable switch means connect in a series with the first and second switch means and connected to the first and second motor means, in a manner that closing said third switch means enables current to be delivered to said first and second motor means,
(m) fourth timing switch means arranged to be closed selectively for a predetermined time interval and connected in series between said first main switch means and said first motor means, so that the first motor means can be caused to operate for a predetermind period of time,
(n) fifth switch means operatively connected to said heating means and responsive to opening and closing of said fourth timing switch means, in a manner that opening of said fourth switch means interrupts power being delivered to said heating means.

16. The oven as recited in claim 15, further comprising a food container sixth positioning switch which is connected in parallel with said fourth timing switch means, said sixth switch means being responsive to the position of the food container in a manner that when the food container is positioned for removal from the oven chamber, said positioning switch means is moved to an open position to stop delivering power to said first motor means at such time as the fourth timing switch means is open.

* * * * *